(12) United States Patent
Nakayama

(10) Patent No.: US 10,205,320 B2
(45) Date of Patent: Feb. 12, 2019

(54) POWER MANAGEMENT APPARATUS, POWER MANAGEMENT SYSTEM, AND POWER MANAGEMENT METHOD

(71) Applicant: KYOCERA Corporation, Kyoto-shi, Kyoto (JP)

(72) Inventor: Taku Nakayama, Yamato (JP)

(73) Assignee: KYOCERA Corporation, Kyoto (JP)

( * ) Notice: Subject to any disclaimer, the term of this patent is extended or adjusted under 35 U.S.C. 154(b) by 192 days.

(21) Appl. No.: 15/107,899

(22) PCT Filed: Dec. 24, 2014

(86) PCT No.: PCT/JP2014/084195
§ 371 (c)(1),
(2) Date: Jun. 23, 2016

(87) PCT Pub. No.: WO2015/098986
PCT Pub. Date: Jul. 2, 2015

(65) Prior Publication Data
US 2016/0322820 A1    Nov. 3, 2016

(30) Foreign Application Priority Data

Dec. 24, 2013 (JP) ................................. 2013-266174

(51) Int. Cl.
*G05B 13/02* (2006.01)
*H02J 3/14* (2006.01)
(Continued)

(52) U.S. Cl.
CPC .............. *H02J 3/14* (2013.01); *G05B 13/026* (2013.01); *G06Q 50/06* (2013.01); *G06Q 50/16* (2013.01);
(Continued)

(58) Field of Classification Search
CPC ....... G05B 13/026; G06Q 50/06; G06Q 50/16
See application file for complete search history.

(56) References Cited

U.S. PATENT DOCUMENTS

2012/0004785 A1* 1/2012 Son ......................... G01D 4/00
700/295
2012/0253881 A1* 10/2012 Schneider .............. G06Q 10/06
705/7.28
(Continued)

FOREIGN PATENT DOCUMENTS

| EP | 1758225 A2 | 2/2007 |
|---|---|---|
| JP | 2005-033952 A | 2/2005 |

(Continued)

OTHER PUBLICATIONS

International Search Report and Written Opinion of the International Searching Authority issued by the Japanese Patent Office for International Application No. PCT/JP2014/084195.

*Primary Examiner* — Vincent H Tran
(74) *Attorney, Agent, or Firm* — Procopio Cory Hargreaves and Savitch LLP

(57) ABSTRACT

A power management apparatus manages power consumptions of a plurality of equipments provided in a facility. The power management apparatus comprises: an acquisition unit configured to acquire power amount information which is information related to power consumption of the plurality of equipments; and a controller configured to calculate, based on the power amount information, a predicted value of a power consumption amount which is an accumulated value of power consumptions of the plurality of equipments in a predetermined time period. The plurality of equipments includes an automatically-controlled equipment to which automatic control of automatically controlling power consumptions by the controller is applicable, and a non-automatically-controlled equipment to which the automatic con-
(Continued)

trol is not applied. The controller notifies a user of information for identifying the non-automatically-controlled equipment from among the plurality of equipments, in a case in which the predicted value exceeds a threshold value.

9 Claims, 6 Drawing Sheets

(51) Int. Cl.
G06Q 50/16 (2012.01)
G06Q 50/06 (2012.01)
H02J 13/00 (2006.01)

(52) U.S. Cl.
CPC ........ *H02J 13/001* (2013.01); *H02J 13/0062* (2013.01); *H02J 13/0075* (2013.01); *Y02B 70/3225* (2013.01); *Y02P 80/11* (2015.11); *Y02P 80/14* (2015.11); *Y04S 20/222* (2013.01)

(56) References Cited

U.S. PATENT DOCUMENTS

| | | | | |
|---|---|---|---|---|
| 2013/0046703 | A1* | 2/2013 | Ambati | G06Q 10/06 705/319 |
| 2013/0079931 | A1* | 3/2013 | Wanchoo | G01D 4/002 700/278 |
| 2013/0338949 | A1* | 12/2013 | Jetcheva | G06Q 10/06 702/62 |
| 2016/0170428 | A1* | 6/2016 | Ichien | G06Q 50/16 700/297 |

FOREIGN PATENT DOCUMENTS

| | | |
|---|---|---|
| JP | 2005-261050 A | 9/2005 |
| JP | 2007-60848 A | 3/2007 |
| JP | 2013-172570 A | 9/2013 |
| JP | 2014-082812 A | 5/2014 |

\* cited by examiner

POWER MANAGEMENT APPARATUS, POWER MANAGEMENT SYSTEM, AND POWER MANAGEMENT METHOD

TECHNICAL FIELD

The present invention relates to a power management apparatus, a power management system, and a power management method for managing a power consumption of an equipment.

BACKGROUND ART

In recent years, in consumer's facilities of grid power, there is growing interest in reduction of power consumptions of equipments provided in the consumer's facilities, for reducing electricity charges. For example, there is known a power management apparatus that applies, to equipments, automatic control of automatically controlling power consumptions of the equipment so that an accumulated value of power consumptions of the equipments in predetermined time period (hereinafter, referred to as a "power consumption amount") does not exceed a threshold value (for example, Patent Literature 1).

Meanwhile, in a facility such as stores, factories, or office buildings (hereinafter, referred to as a "facility"), a number of equipments is used. Among the equipments used in the facility, an equipment to which the automatic control is not applied (hereinafter, referred to as a "non-automatically-controlled equipment") is included in some cases. In such a facility, even if the automatic control is applied to an equipment to which the automatic control is applicable (hereinafter, referred to as an "automatically-controlled equipment"), a power consumption amount may exceed a threshold value.

For further reducing a power consumption amount in such a case, it is effective to manually reduce the power consumption of the non-automatically-controlled equipment. Nevertheless, it is difficult for users to identify the non-automatically-controlled equipment from among a number of equipments.

CITATION LIST

Patent Literature

Patent Literature 1: Japanese application publication No. 2005-261050

SUMMARY OF INVENTION

A power management apparatus according to a first aspect manages power consumptions of a plurality of equipments provided in a facility. The power management apparatus comprises: an acquisition unit configured to acquire power amount information which is information related to power consumption of the plurality of equipments; and a controller configured to calculate, based on the power amount information, a predicted value of a power consumption amount which is an accumulated value of power consumptions of the plurality of equipments in a predetermined time period. The plurality of equipments includes an automatically-controlled equipment to which automatic control of automatically controlling power consumptions by the controller is applicable, and a non-automatically-controlled equipment to which the automatic control is not applied. The controller notifies a user of information for identifying the non-automatically-controlled equipment from among the plurality of equipments, in a case in which the predicted value exceeds a threshold value.

In the first aspect, the power management apparatus further comprises a storage configured to store equipment information pieces of the plurality of respective equipments that include power consumptions in each operation mode. The automatic control includes control of switching, in a case in which the predicted value of the power consumption amount exceeds the threshold value, an operation mode of the automatically-controlled equipment to an operation mode in which a power consumption is smaller than that in an operation mode set before the automatic control is applied.

In the first aspect, in a case of applying the automatic control to the automatically-controlled equipment, the controller updates the predicted value, and in a case in which the updated predicted value exceeds the threshold value, the controller notifies a user of information for identifying the non-automatically-controlled equipment from among the plurality of equipments.

In the first aspect, the power management apparatus further comprises a display configured to display an equipment arrangement drawing in which objects corresponding to the plurality of respective equipments are arranged on a floor plan of the facility. In a case in which the predicted value exceeds the threshold value, the display acquires information for identifying the non-automatically-controlled equipment from among the plurality of equipments, and highlights an object corresponding to the non-automatically-controlled equipment, in the equipment arrangement drawing.

In the first aspect, the controller calculates a reduction target value of the power consumption amount based on the updated predicted value and the threshold value. The display further displays the reduction target value.

In the first aspect, the controller identifies a recommended equipment of which a power consumption is to be manually controlled, from among the non-automatically-controlled equipments, according to the reduction target value and equipment information pieces corresponding to the non-automatically-controlled equipments. The display further displays information for identifying the recommended equipment.

In the first aspect, in a case in which an instruction device for manually controlling a power consumption of the recommended equipment is provided, the display highlights an object corresponding to the instruction device, in the equipment arrangement drawing.

A power management system according to a second aspect manages power consumptions of a plurality of equipments provided in a facility. The power management system comprises: an acquisition unit configured to acquire power amount information which is information related to power consumption of the plurality of equipments; and a controller configured to calculate, based on the power amount information, a predicted value of a power consumption amount which is an accumulated value of power consumptions of the plurality of equipments in a predetermined time period. The plurality of equipments includes an automatically-controlled equipment to which automatic control of automatically controlling power consumptions by the controller is applicable, and a non-automatically-controlled equipment to which the automatic control is not applied. The controller notifies a user of information for identifying the nonautomatically-controlled equipment from among the plurality of equipments, in a case in which the predicted value exceeds a threshold value.

A power management method according to a third aspect manages power consumptions of a plurality of equipments provided in a facility. The power management method comprising the steps of: acquiring power amount information which is information related to power consumption of the plurality of equipments; and calculating, based on the power amount information, a predicted value of a power consumption amount which is an accumulated value of power consumptions of the plurality of equipments in a predetermined time period. The plurality of equipments includes an automatically-controlled equipment to which automatic control of automatically controlling power consumptions is applicable, and a non-automatically-controlled equipment to which the automatic control is not applied. The power management method further includes the step of notifying a user of information for identifying the non-automatically-controlled equipment from among the plurality of equipments, in a case in which the predicted value exceeds a threshold value.

DESCRIPTION OF EMBODIMENTS

Hereinafter, the power management system according to the embodiment will be described. Note that the same or similar reference signs are applied to the same or similar portions in the following descriptions of the drawings.

It must be understood that the drawings are schematic, and the ratio of each dimension and the like may differ from the real one. Accordingly, specific dimensions and the like should be understood with reference to the following description. Furthermore, it must be understood that, the relationship or ratio of dimensions included in each of the drawings may differ.

[Overview of Embodiments]

A power management apparatus according to the embodiments manages power consumptions of a plurality of equipments provided in a facility. The power management apparatus comprises: an acquisition unit configured to acquire power amount information which is information related to power consumption of the plurality of equipments; and a controller configured to calculate, based on the power amount information, a predicted value of a power consumption amount which is an accumulated value of power consumptions of the plurality of equipments in a predetermined time period. The plurality of equipments includes an automatically-controlled equipment to which automatic control of automatically controlling power consumptions by the controller is applicable, and a non-automatically-controlled equipment to which the automatic control is not applied. The controller notifies a user of information for identifying the non-automatically-controlled equipment from among the plurality of equipments, in a case in which the predicted value exceeds a threshold value.

In the embodiments, in a case in which a predicted value of a power consumption amount exceeds a threshold value, information for identifying non-automatically-controlled equipments from among a plurality of equipments is notified to the user. Thus, it is possible to request power consumption amount reduction obtained by manually controlling the non-automatically-controlled equipments from the user, and thus a power consumption amount can be appropriately reduced.

[First Embodiment]
(Power Management System)

Figure 1:
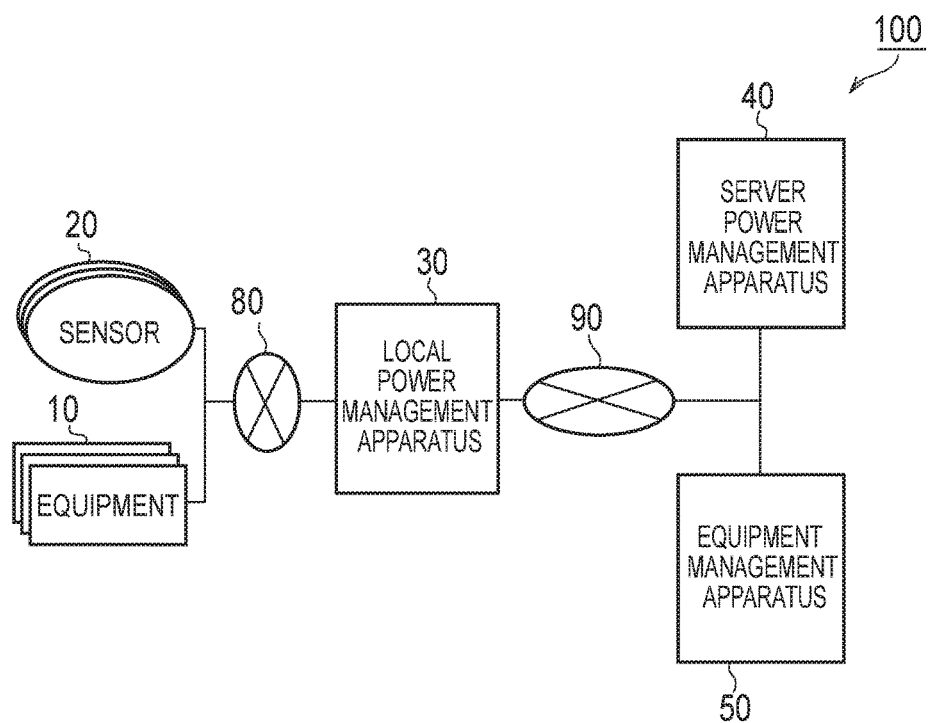
FIG. 1 is a diagram illustrating a power management system according to a first embodiment.

A power management system according to a first embodiment will be described below. FIG. 1 is a diagram illustrating a power management system 100 according to the first embodiment.

As illustrated in FIG. 1, the power management system 100 includes a plurality of equipments 10, a plurality of sensors 20, a local power management apparatus 30, a server power management apparatus 40, and an equipment management apparatus 50.

The equipments 10 are equipments consuming power that are provided in a facility such as stores, factories, or office buildings (hereinafter, referred to as a "facility"). For example, the equipments 10 are air conditioners, illuminations, cooling cases, or the like.

Here, the plurality of equipments 10 includes automatically-controlled equipments to which automatic control of automatically controlling power consumptions is applicable, and non-automatically-controlled equipments to which the automatic control is not applied. In other words, the automatically-controlled equipments operate in an operation mode set according to a control signal received from the local power management apparatus 30, which will be described later. Meanwhile, the non-automatically-controlled equipments operate in an operation mode set according to an instruction from the user. In addition, the facility may be further provided with a device for manually controlling the power consumptions of the equipments 10. In other words, the facility may be further provided with an instruction device for the user instructing an operation mode of the equipments 10.

The sensors 20 are devices for detecting the power consumptions of the equipments 10. For example, the sensors 20 may be a power meter for detecting the total power consumption of the plurality of equipments 10, or may be ammeters provided for the respective equipments 10.

The local power management apparatus 30 manages the equipments 10 connected via a local area network (LAN) 80 provided within the facility. Specifically, the local power management apparatus 30 is connected to the equipments 10 and the sensors 20 via the LAN 80, and manages the power consumptions of the equipments 10 based on information detected by the sensors 20.

In the first embodiment, the local power management apparatus 30 controls an operation mode of the equipments 10 according to a control signal received from the server power management apparatus 40, which will be described later. Specifically, the local power management apparatus 30 controls an operation mode of automatically-controlled equipments included in the plurality of equipments 10.

The server power management apparatus 40 is connected to the local power management apparatus 30 via a wide area network (WAN) 90, and manages the power consumptions of the equipments 10 via the local power management apparatus 30.

The equipment management apparatus 50 stores location information pieces of the equipments 10 in the facility. In a case in which instruction devices of the equipments 10 are provided, the equipment management apparatus 50 stores location information pieces of the instruction devices in the facility in association with the location information pieces of the corresponding equipments 10. In addition, the equipment management apparatus 50 may manage maintenance information indicating a history of maintenance such as the replacement of the equipments 10 or the repair of the equipments 10.

(Power Management Apparatus)

Figure 2:
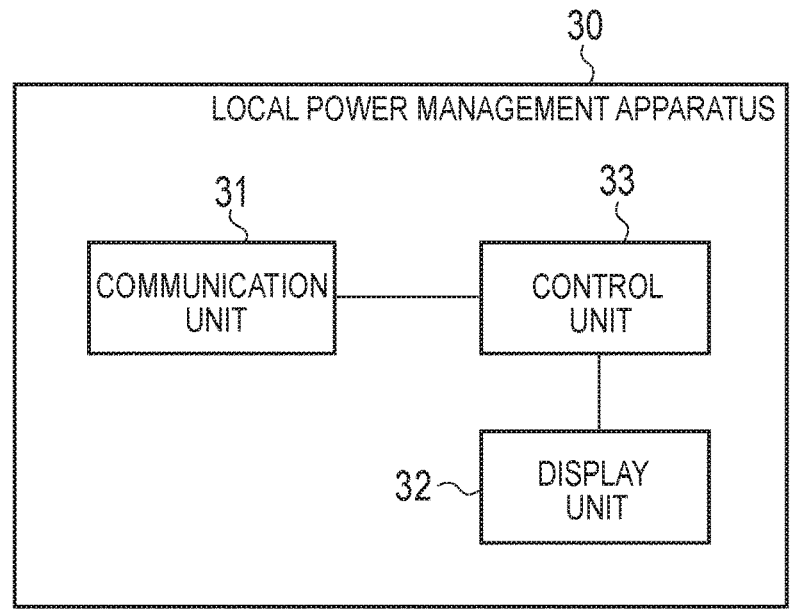
FIG. 2 is a block diagram illustrating a local power management apparatus according to the first embodiment.
Figure 3:
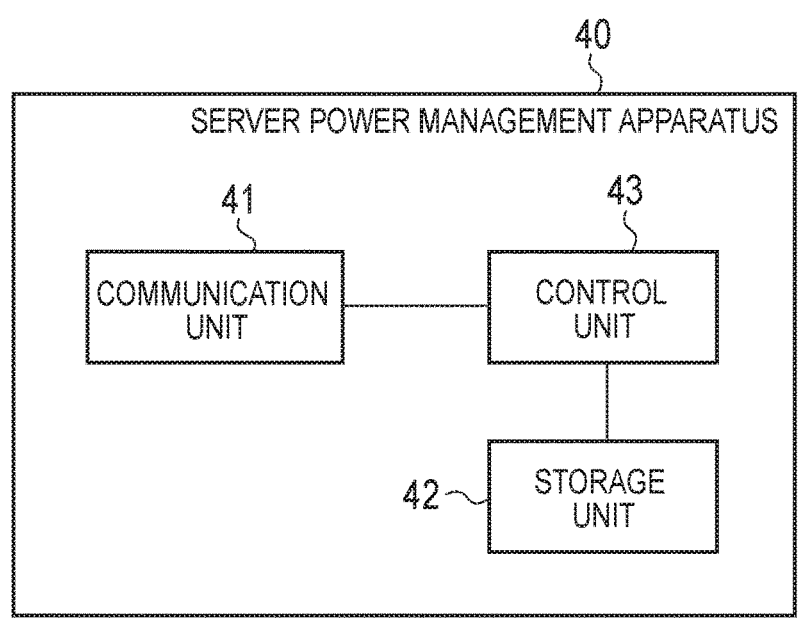
FIG. 3 is a block diagram illustrating a server power management apparatus according to the first embodiment.

The power management apparatuses according to the first embodiment will be described below. FIG. 2 is a block diagram illustrating the local power management apparatus 30 according to the first embodiment. FIG. 3 is a block diagram illustrating the server power management apparatus 40 according to the first embodiment. In the first embodiment, the local power management apparatus 30 and the server power management apparatus 40 each serve as an example of power management apparatuses.

First, the local power management apparatus 30 will be described. As illustrated in FIG. 2, the local power management apparatus 30 includes a communication unit 31, a display unit 32, and a control unit 33.

The communication unit 31 is a communication module for performing communication with the equipments 10 and the sensors 20 via the LAN 80. The communication unit 31 receives equipment information pieces of the equipments 10. The equipment information pieces include, for example, equipment IDs and equipment types of the equipments 10, the power consumptions of the equipments 10 in each operation mode, and the like.

The communication unit 31 receives, from the sensors 20, power amount information, which is information related to the power consumption of the plurality of equipments 10. The power amount information is information for identifying a power consumption amount, which is an accumulated value of power consumptions of the plurality of equipments 10 in a predetermined time period (hereinafter, referred to as a "power consumption amount").

The communication unit 31 transmits, to the equipments 10, a control signal for controlling an operation mode of the equipments 10. Specifically, the communication unit 31 transmits a control signal to automatically-controlled equipments included in the plurality of equipments 10.

In addition, the communication unit 31 performs communication with the server power management apparatus 40 via the WAN 90. The communication unit 31 may perform communication with the equipment management apparatus 50 via the WAN 90.

The communication unit 31 transmits the equipment information pieces of the equipments 10 to the server power management apparatus 40. The communication unit 31 transmits the power amount information to the server power management apparatus 40. In addition, the communication unit 31 may transmit an operation mode of the equipments 10 to the server power management apparatus 40.

In a case in which a predicted value of a power consumption amount exceeds a threshold value, the communication unit 31 receives, from the server power management apparatus 40, information for identifying non-automatically-controlled equipments from among the plurality of equipments 10.

Here, arbitrary numerical values are settable as the predetermined time period and the threshold value. For example, numerical values affecting an electricity charge may be set. For example, in a Japanese system, an electricity charge is composed of a basic charge and a usage-based charge. The basic charge is set according to an accumulated value of power consumptions measured every 30 minutes (hereinafter, referred to as a "30-minute demand"). More specifically, the basic charge is calculated according to contracted power. The contracted power corresponds to the maximum value in the past 1 year of the monthly maximum values of the 30-minute demands (hereinafter, referred to as the "maximum demand"). Thus, under such a system, contracted power can be lowered by reducing the 30-minute demand, so that an electricity charge can be reduced. In contrast, if the 30-minute demand exceeds current contracted power, the contracted power is raised, leading to an increase in electricity charge. For reducing an electricity charge, for example, the predetermined time period may be set to 30 minutes, and the threshold value may be set according to the current contracted power.

The display unit 32 displays information acquired from the server power management apparatus 40 via the communication unit 31, using a web browser, an application, or the like. In addition, the display unit 32 displays an equipment arrangement drawing in which objects corresponding to the plurality of respective equipments 10 are arranged on a floor plan of the facility.

In a case in which a predicted value of a power consumption amount exceeds the threshold value, the display unit 32 acquires the information for identifying non-automatically-controlled equipments from among the plurality of equipments 10, and highlights objects corresponding to the non-automatically-controlled equipments, in the equipment arrangement drawing.

The control unit 33 controls the local power management apparatus 30. In addition, the control unit 33 generates information for displaying information acquired from the server power management apparatus 40, on the display unit 32. Specifically, based on the information acquired from the server power management apparatus 40, the control unit 33 generates the equipment arrangement drawing in which the objects corresponding to the plurality of respective equipments 10 are arranged on the floor plan of the facility.

Next, the server power management apparatus 40 will be described. As illustrated in FIG. 3, the server power management apparatus 40 includes a communication unit 41, a storage unit 42, and a control unit 43.

The communication unit 41 is a communication module for performing communication with the local power management apparatus 30 and the equipment management apparatus 50 via the WAN 90.

The communication unit 41 receives the equipment information pieces of the equipments 10 from the local power management apparatus 30. The communication unit 41 receives, from the local power management apparatus 30, power amount information for identifying a power consumption amount. In addition, the communication unit 41 may receive, from the local power management apparatus 30, information indicating an operation mode of the equipments 10.

The communication unit 41 receives, from the equipment management apparatus 50, information for generating the equipment arrangement drawing. The information for generating the equipment arrangement drawing includes location information pieces of the equipments and floor plan information of the facility. In addition, the communication unit 41 transmits the information for generating the equipment arrangement drawing, to the local power management apparatus 30.

The communication unit 41 transmits, to the local power management apparatus 30, a control signal for controlling an operation mode of the equipments 10. Specifically, the communication unit 41 transmits, to the local power management apparatus 30, a control signal for controlling an operation mode of automatically-controlled equipments.

In a case in which a predicted value of a power consumption amount exceeds the threshold value, the communication unit 41 notifies the user of the information for identifying non-automatically-controlled equipments from among the plurality of equipments 10. Specifically, the communication unit 41 transmits, to the local power management apparatus 30, the information for identifying non-automatically-controlled equipments from among the plurality of equipments 10.

The storage unit 42 stores information acquired from the local power management apparatus 30. Specifically, the storage unit 42 stores the equipment information pieces of the equipments 10. The storage unit 42 may store information acquired from the equipment management apparatus 50.

The control unit 43 manages the server power management apparatus 40. In addition, based on the power amount information, the control unit 43 calculates a predicted value of a power consumption amount, which is an accumulated value of power consumptions of the plurality of equipments 10 in the predetermined time period (hereinafter, referred to as a "power consumption amount"). For example, based on the power amount information, the control unit 43 calculates change rates of power consumptions of the plurality of equipments 10, and based on the calculated change rates and an accumulated value of power consumptions of the plurality of equipments 10 in calculating the change rates, calculates a predicted value of a power consumption amount.

In addition, the control unit 43 generates a control signal for controlling an operation mode of automatically-controlled equipments. Specifically, in a case in which a predicted value of a power consumption amount exceeds the threshold value, the control unit 43 applies automatic control to automatically-controlled equipments. Specifically, the automatic control includes control of switching, in a case in which a predicted value of a power consumption amount exceeds the threshold value, an operation mode of the automatically-controlled equipments to an operation mode in which power consumptions are smaller than those in an operation mode set before the automatic control is applied.

In addition, in a case of applying the automatic control to the automatically-controlled equipments, the control unit 43 updates a predicted value, and in a case in which the updated predicted value exceeds the threshold value, the control unit 43 notifies the user of the information for identifying non-automatically-controlled equipments from among the plurality of equipments 10. Specifically, in a case in which the updated predicted value exceeds the threshold value, the control unit 43 transmits, to the local power management apparatus 30 via the communication unit 41, the information for identifying non-automatically-controlled equipments from among the plurality of equipments 10. As described above, the display unit 32 of the local power management apparatus 30 highlights the objects corresponding to the non-automatically-controlled equipments, in the equipment arrangement drawing.

(Display Mode)

Figure 4:
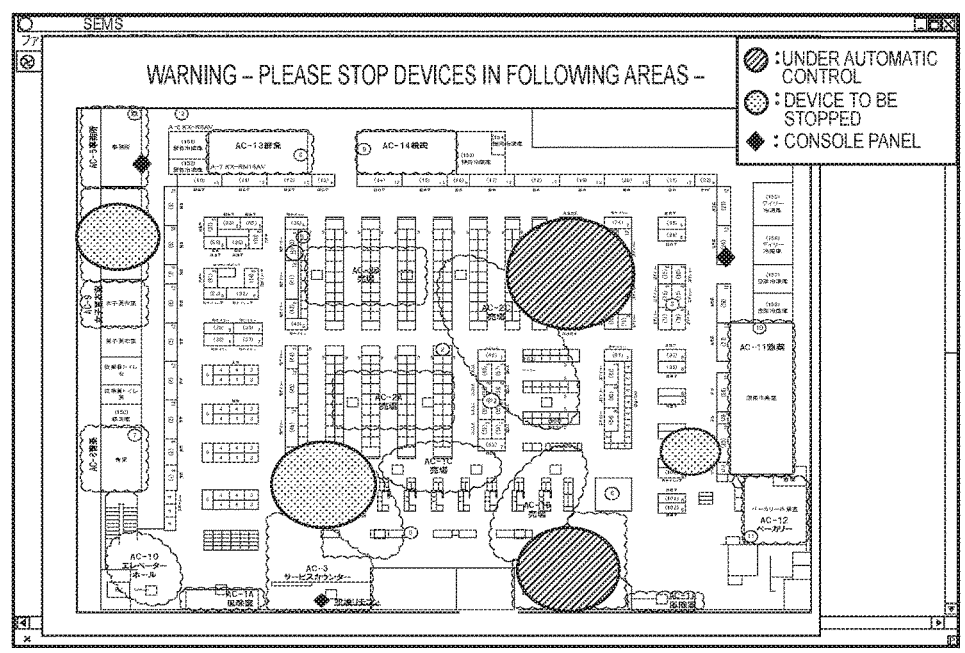
FIG. 4 is a diagram illustrating an example of a display mode according to the first embodiment.

A display mode according to the first embodiment will be described below. FIG. 4 is a diagram illustrating an example of a display mode according to the first embodiment.

As illustrated in FIG. 4, the display unit 32 of the local power management apparatus 30 displays an equipment arrangement drawing in which objects corresponding to the plurality of respective equipments 10 are arranged on a floor plan of the facility.

In a case in which a predicted value of a power consumption amount exceeds the threshold value, the control unit 43 of the server power management apparatus 40 applies the automatic control to the automatically-controlled equipments. Specifically, the control unit 43 switches an operation mode of the automatically-controlled equipments to an operation mode in which power consumptions are smaller than those in an operation mode set before the automatic control is applied. In addition, the control unit 43 transmits, to the local power management apparatus 30 via the communication unit 41, information for identifying automatically-controlled equipments.

The display unit 32 acquires, via the communication unit 31, the information for identifying automatically-controlled equipments, and highlights objects corresponding to the automatically-controlled equipments, in the equipment arrangement drawing. For example, in the equipment arrangement drawing, a hatching pattern is added to objects corresponding to automatically-controlled equipments, and in an explanatory note, it is displayed that objects to which the hatching pattern is added correspond to equipments "under automatic control". In addition, as illustrated in FIG. 4, in the equipment arrangement drawing, circular objects changing in size according to the magnitudes of power consumptions in the respective equipments may be displayed with being superimposed on the objects corresponding to the automatically-controlled equipments. These circular objects are objects for indicating the magnitudes of power consumptions. Accordingly, the circular objects can also be said to be the magnitudes of parameters to be affected when the automatic control is performed. Consequently, the circular objects can also be said to be change amounts (reduction amounts) of power consumptions.

In a case of applying the automatic control to the automatically-controlled equipments, the control unit 43 updates a predicted value of a power consumption amount. In a case in which the updated predicted value exceeds the threshold value, the control unit 43 transmits, to the local power management apparatus 30 via the communication unit 41, the information for identifying non-automatically-controlled equipments from among the plurality of equipments 10.

The display unit 32 acquires, from the communication unit 31, the information for identifying non-automatically-controlled equipments, and highlights objects corresponding to the non-automatically-controlled equipments, in the equipment arrangement drawing. For example, in the equipment arrangement drawing, a predetermined color is added to the objects corresponding to the non-automatically-controlled equipments, and in the explanatory note, it is displayed that the objects to which the predetermined color is added correspond to "devices to be stopped". With this configuration, the user can easily recognize equipments to be manually controlled (e.g., stopped) for reducing power consumptions. In addition, as illustrated in FIG. 4, in the equipment arrangement drawing, circular objects indicating change amounts (reduction amounts) of power consumptions obtained by manually controlling the equipments may be displayed with being superimposed on the objects corresponding to the non-automatically-controlled equipments. With this configuration, the user can recognize a power consumption reduction effect obtained by manually controlling the equipments, and can obtain a guideline for determining equipments to which manual control is to be applied.

In addition, the display unit 32 preferably displays text information requesting the user to manually control the non-automatically-controlled equipments. Furthermore, the local power management apparatus 30 preferably notifies the user of a message requesting the user to manually control the non-automatically-controlled equipments, by generating alarm sound or the like.

In addition, in a case in which instruction devices of the equipments 10 are provided, the display unit 32 displays objects corresponding to the instruction devices, in the equipment arrangement drawing. For example, as illustrated in FIG. 4, in the equipment arrangement drawing, the instruction devices are displayed as diamond symbols.

The display unit 32 acquires, from the communication unit 31, information for identifying instruction devices of non-automatically-controlled equipments, and highlights objects corresponding to the instruction devices of the non-automatically-controlled equipments, in the equipment arrangement drawing. For example, as illustrated in FIG. 4, in the equipment arrangement drawing, a predetermined color is added to the objects (diamond symbols) corresponding to the instruction devices of the non-automatically-controlled equipments, and in the explanatory note, it is displayed that the diamond symbols to which the predetermined color is added correspond to "console panels", i.e., the instruction devices of the non-automatically-controlled equipments.

(Power Management Method)

Figure 5:
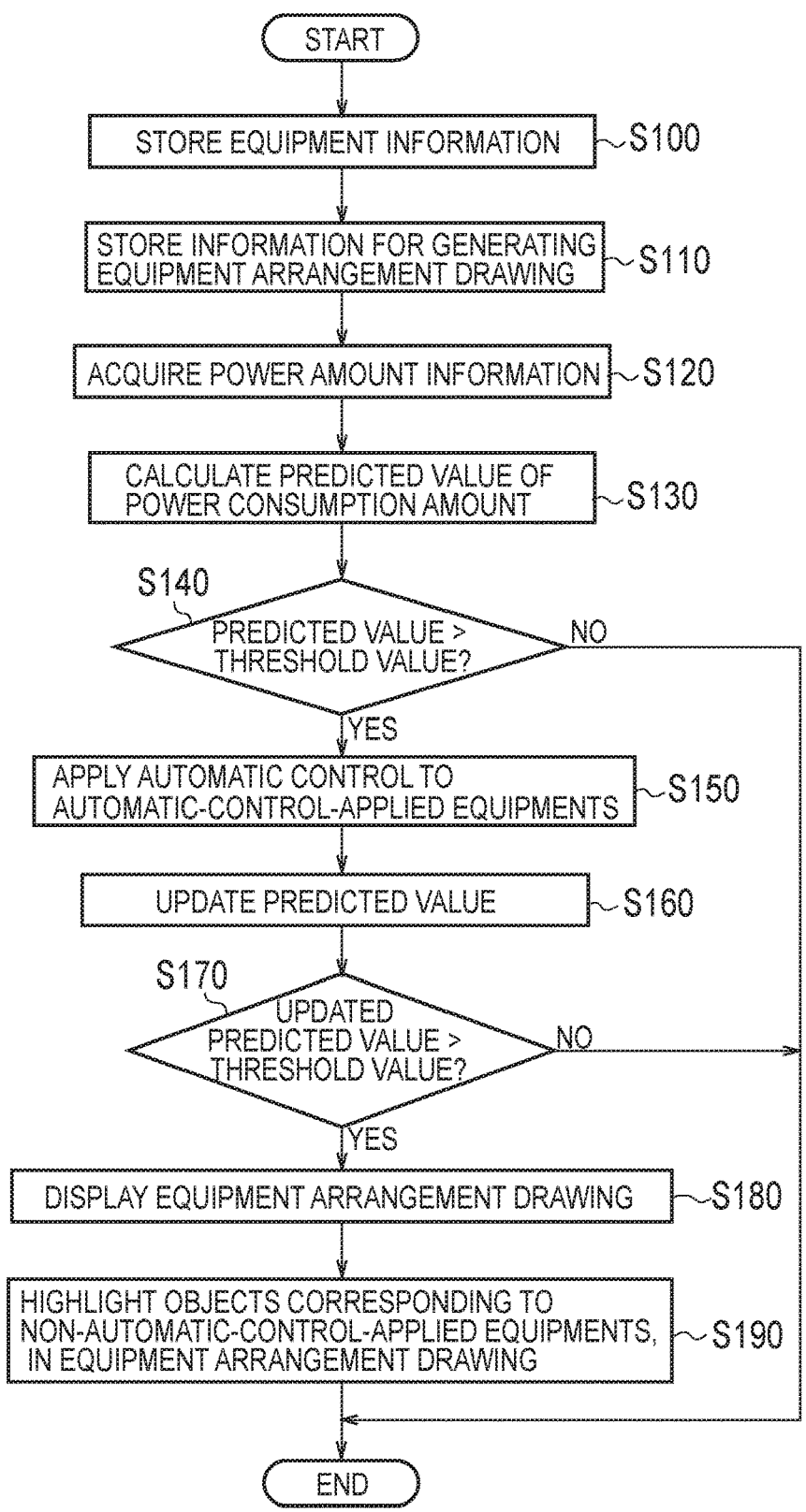
FIG. 5 is a flowchart illustrating an equipment management method according to the first embodiment.

A power management method according to the first embodiment will be described below. FIG. 5 is a diagram illustrating the power management method according to the first embodiment.

As illustrated in FIG. 5, in step S100, the server power management apparatus 40 stores equipment information pieces of the respective equipments 10.

In step S110, the server power management apparatus 40 stores information for generating the equipment arrangement drawing.

In step S120, the server power management apparatus 40 acquires power amount information.

In step S130, the server power management apparatus 40 calculates a predicted value of a power consumption amount.

In step S140, the server power management apparatus 40 determines whether a predicted value of a power consumption amount exceeds a threshold value. If a determination result is "YES", the server power management apparatus 40 advances the processing to step S150. If a determination result is "NO", the server power management apparatus 40 ends the processing.

In step S150, the server power management apparatus 40 applies automatic control to automatically-controlled equipments.

In step S160, the server power management apparatus 40 updates a predicted value of a power consumption amount.

In step S170, the server power management apparatus 40 determines whether the updated predicted value exceeds the threshold value. If a determination result is "YES", the server power management apparatus 40 advances the processing to step S180. If a determination result is "NO", the server power management apparatus 40 ends the processing.

In step S180, the local power management apparatus 30 displays the equipment arrangement drawing.

In step S190, the local power management apparatus 30 highlights objects corresponding to the non-automatically-controlled equipments, in the equipment arrangement drawing.

As described above, in the first embodiment, by the highlighting of objects corresponding to non-automatically-controlled equipments, in the equipment arrangement drawing, the user is notified of information for identifying non-automatically-controlled equipments from among a plurality of equipments. With this configuration, the user can select equipments to which manual control is to be applied, from among non-automatically-controlled equipments, without wrongly applying manual control to equipments to which automatic control is to be applied. As a result, a power consumption amount can be appropriately reduced.

[Modified Example 1]

Figure 6:
FIG. 6 is a diagram illustrating an example of a display mode according to Modified Example 1.

Modified Example 1 of the first embodiment will be described below. FIG. 6 is a diagram illustrating an example of a display mode according to Modified Example 1. The following description will be given mainly of a difference from the first embodiment.

In a case in which a power consumption amount exceeds a threshold value, the control unit 43 of the server power management apparatus 40 calculates a reduction target value of the power consumption amount based on a predicted value of a power consumption amount and the threshold value. Based on the reduction target value and equipment information pieces of automatically-controlled equipments, the control unit 43 identifies an equipment 10 to which automatic control is to be applied. In other words, in Modified Example 1, unlike the first embodiment, an equipment 10 to which automatic control is to be applied is identified according to the reduction target value, instead of applying automatic control to all the automatically-controlled equipments.

Specifically, the control unit 43 identifies an equipment 10 to which automatic control is to be applied, in such a manner that a power consumption amount reduced by applying automatic control exceeds the reduction target value. More specifically, the control unit 43 identifies an equipment 10 to which automatic control is to be applied, in such a manner that a power consumption amount reduced in a case in which an operation mode of an automatically-controlled equipment is switched to an operation mode in which a power consumption is small exceeds the reduction target value. The control unit 43 switches an operation mode of the equipment 10 identified as an equipment 10 to which automatic control is to be applied. The control unit 43 transmits, to the local power management apparatus 30 via the communication unit 41, information for identifying an equipment 10 to which automatic control is to be applied.

The display unit 32 acquires the information for identifying an equipment 10 to which automatic control is to be applied, from the communication unit 31, and highlights an object corresponding to the equipment 10 to which automatic control is to be applied, in the equipment arrangement drawing. For example, as illustrated in FIG. 6, in the equipment arrangement drawing, a hatching pattern is added to an object corresponding to the equipment 10 to which automatic control is to be applied, and in an explanatory note, it is displayed that the object to which the hatching pattern is added corresponds to the equipment 10 "under automatic control".

In a case of applying the automatic control to the automatically-controlled equipments, the control unit 43 updates a predicted value of a power consumption amount. In a case in which the updated predicted value exceeds the threshold value, the control unit 43 further identifies an equipment 10 to which automatic control is to be applied, from among equipments which are automatically-controlled equipments and to which automatic control is not applied. In other words, the control unit 43 repeats the identification of an equipment 10 to which automatic control is to be applied, until a predicted value of a power consumption amount falls below the threshold value. On the other hand, in a case in which the updated predicted value falls below the threshold value, the control unit 43 periodically compares a predicted value of a power consumption amount with the threshold value without further identifying an equipment 10 to which automatic control is to be applied.

In a case in which a predicted value of a power consumption amount exceeds the threshold value even though automatic control is applied to all the automatically-controlled equipments, the control unit 43 identifies a recommended equipment of which a power consumption is to be manually controlled, from among non-automatically-controlled equipments according to the reduction target value and equipment information pieces corresponding to the non-automatically-controlled equipments. Specifically, a recommended equipment is identified in such a manner that a power consumption amount reduced by manual control exceeds the reduction target value.

The control unit 43 transmits, to the local power management apparatus 30 via the communication unit 41, information for identifying a recommended equipment. In addition, the control unit 43 transmits, to the local power management apparatus 30 via the communication unit 41, information indicating the reduction target value.

The display unit 32 further displays the information for identifying a recommended equipment. In addition, the display unit 32 further displays the information indicating the reduction target value. For example, as illustrated in FIG. 6, the display unit 32 displays a window indicating a reduction target value and recommended equipments, and notifies the user that a power consumption amount corresponding to the reduction target value needs to be reduced by manually controlling the recommended equipments.

The display unit 32 acquires, from the communication unit 31, information for identifying instruction devices of non-automatically-controlled equipments, and highlights objects corresponding to the instruction devices of the non-automatically-controlled equipments, in the equipment arrangement drawing. For example, as illustrated in FIG. 4, in the equipment arrangement drawing, a predetermined color is added to diamond symbols corresponding to instruction devices of non-automatically-controlled equipments among objects (diamond symbols) corresponding to instruction devices, and in the explanatory note, it is displayed that the diamond symbols to which the predetermined color is added correspond to "console panels", i.e., the instruction devices of the non-automatically-controlled equipments.

Figure 7:
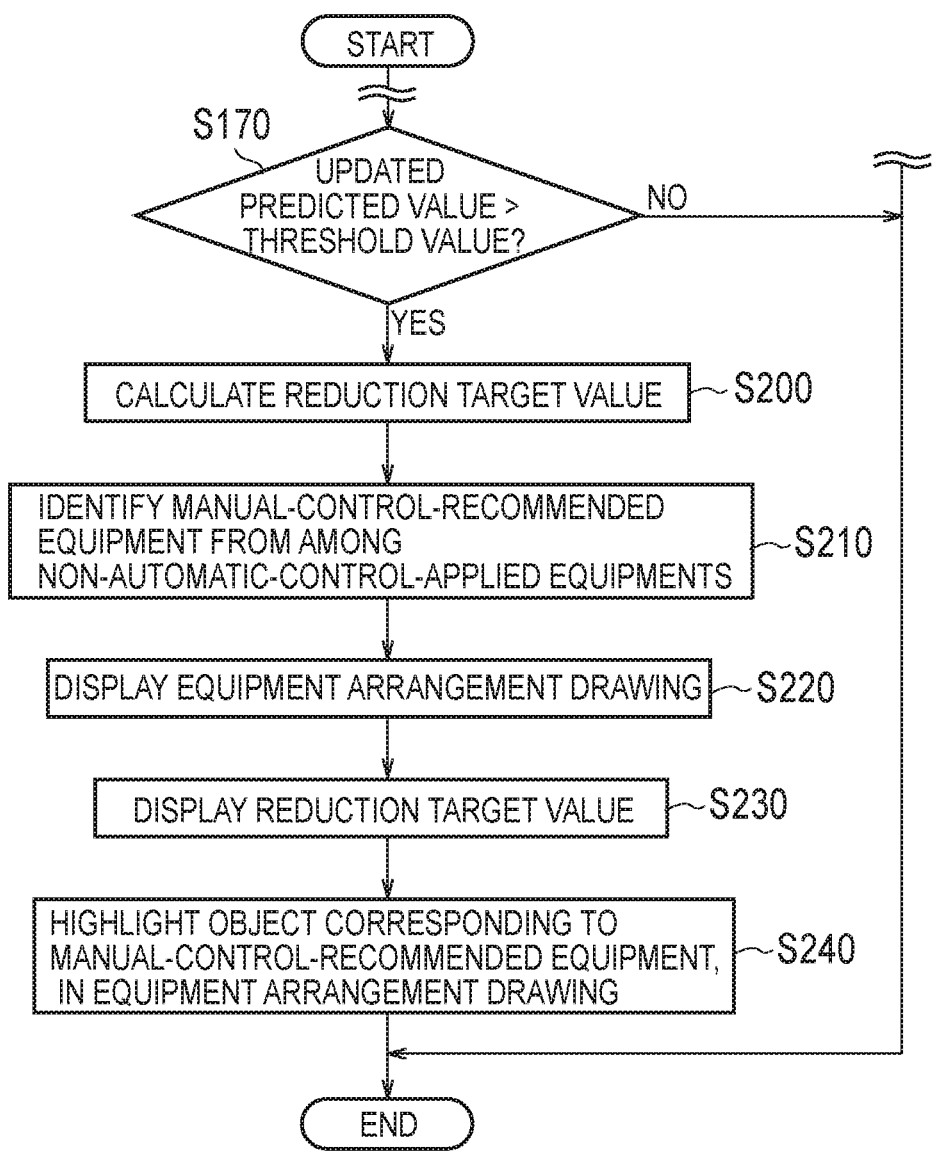
FIG. 7 is a flowchart illustrating an equipment management method according to Modified Example 1.

Next, a power management method according to Modified Example 1 will be described. FIG. 7 is a diagram illustrating the power management method according to Modified Example 1. Steps S100 to S170 illustrated in FIG. 5 are applied in common to Modified Example 1. Thus, the following description will be given mainly of a difference from the first embodiment.

In step S170, the server power management apparatus 40 determines whether the updated predicted value exceeds the threshold value. If a determination result is "YES", the server power management apparatus 40 advances the processing to step S200. If a determination result is "NO", the server power management apparatus 40 ends the processing.

In step S200, the server power management apparatus 40 calculates a reduction target value of a power consumption amount based on the updated predicted value and the threshold value.

In step S210, the server power management apparatus 40 identifies a recommended equipment from among non-automatically-controlled equipments.

In step S220, the local power management apparatus 30 displays the equipment arrangement drawing.

In step S230, the local power management apparatus 30 further displays the reduction target value.

In step S240, the local power management apparatus 30 highlights an object corresponding to the recommended equipment, in the equipment arrangement drawing.

As described above, in Modified Example 1, a recommended equipment is identified from among non-automatically-controlled equipments. Thus, the user can recognize which equipment among non-automatically-controlled equipments is to be manually controlled for achieving the reduction target value. As a result, a power consumption amount can be appropriately reduced while holding an operational problem to the minimum by the requisite minimum manual control.

[Other Embodiments]

The present invention has been described using the above-described embodiment. The description and the drawings that constitute part of this disclosure are not to be construed as limiting the present invention. From this disclosure, various alternative embodiments, examples, and operation techniques will become apparent to the one skilled in the art.

In the embodiment, the description has been given assuming that the server power management apparatus 40 (the control unit 43) calculates a predicted value of a power consumption amount, and generates a control signal for controlling an operation mode of automatically-controlled equipments. Nevertheless, embodiments are not limited to this. The local power management apparatus 30 (the control unit 33) may calculate a predicted value of a power consumption amount, and generate a control signal for controlling an operation mode of automatically-controlled equipments.

In the embodiment, the description has been given assuming that the local power management apparatus 30 (the control unit 33) generates the equipment arrangement drawing. Nevertheless, embodiments are not limited to this. The server power management apparatus 40 (the control unit 43) may generate the equipment arrangement drawing based on information acquired from the equipment management apparatus 50, and transmit information for displaying the equipment arrangement drawing, to the local power management apparatus 30.

In the embodiment, the description has been given assuming that automatic control includes control of switching, in a case in which a predicted value of a power consumption amount exceeds the threshold value, an operation mode of the automatically-controlled equipments to an operation mode in which power consumptions are smaller than those in an operation mode set before the automatic control is applied. Nevertheless, embodiments are not limited to this. The automatic control may include control of returning, in a case in which a predicted value of a power consumption amount obtained in a case in which automatically-controlled equipments continue to operate in an original operation mode falls below the threshold value, an operation mode to the original operation mode.

In the embodiment, the description has been given assuming that the local power management apparatus 30 is configured to implement the acquisition of power consumptions of equipments, the application of automatic control, and the information display for the user, in an integrated apparatus. Nevertheless, embodiments are not limited to this. For example, a separately-provided display terminal device may be assigned to functions of the display unit 32 and the control unit 33 that relate to display control.

In addition, Japanese Patent Application No. 2013-266174 (filed Dec. 24, 2013) is incorporated by reference herein in its entirety.

INDUSTRIAL APPLICABILITY

According to the embodiment, there can be provided a power management apparatus, a power management system, and a power management method that can appropriately reduce a power consumption amount.

The invention claimed is:

1. A power management apparatus for managing power consumptions of a plurality of equipments provided in a facility, the power management apparatus comprising:
an acquisition unit configured to acquire power amount information which is information related to power consumption of the plurality of equipments;
a display configured to display an equipment arrangement drawing in which objects corresponding to the plurality of respective equipments are arranged on a floor plan of the facility; and
a controller configured to calculate, based on the power amount information, a predicted value of a power consumption amount which is an accumulated value of power consumptions of the plurality of equipments in a predetermined time period,
wherein
the plurality of equipments includes an automatically-controlled equipment to which automatic control of automatically controlling power consumptions by the controller is applicable, and a non-automatically-controlled equipment to which the automatic control is not applied,
the controller applies a target automatic control to the automatically-controlled equipment, when the predicted value exceeds a threshold value, the target automatic control is an operation mode having power consumption less than an operation mode prior to applying the target automatic control, and,
when the predicted value exceeds the threshold value, the display acquires information for identifying the non-automatically-controlled equipment from among the plurality of equipments, and highlights an object corresponding to the non-automatically-controlled equipment in the equipment arrangement drawing.

2. The power management apparatus according to claim 1, wherein the controller calculates a reduction target value of the power consumption amount based on an updated predicted value, updated by applying the target automatic control, and the threshold value, and the display further displays the reduction target value.

3. The power management apparatus according to claim 2, wherein the controller identifies a recommended equipment of which a power consumption is to be manually controlled, from among the non-automatically-controlled equipments, according to the reduction target value and equipment information pieces corresponding to the non-automatically-controlled equipments, and the display further displays information for identifying the recommended equipment.

4. The power management apparatus according to claim 3, wherein, when an instruction device for manually controlling a power consumption of the recommended equipment is provided, the display highlights an object corresponding to the instruction device, in the equipment arrangement drawing.

5. The power management apparatus according to claim 1, wherein the controller notifies a user of information for identifying the non-automatically-controlled equipment when an updated value, updated by applying the target automatic control, exceeds the threshold value.

6. A power management system for managing power consumptions of a plurality of equipments provided in a facility, the power management system comprising:
an acquisition unit configured to acquire power amount information which is information related to power consumption of the plurality of equipments;
a display configured to display an equipment arrangement drawing in which objects corresponding to the plurality of respective equipments are arranged on a floor plan of the facility; and
a controller configured to calculate, based on the power amount information, a predicted value of a power consumption amount which is an accumulated value of power consumptions of the plurality of equipments in a predetermined time period,
wherein
the plurality of equipments includes an automatically-controlled equipment to which automatic control of automatically controlling power consumptions by the controller is applicable, and a non-automatically-controlled equipment to which the automatic control is not applied,
the controller applies a target automatic control to the automatically-controlled equipment, when the predicted value exceeds a threshold value, the target automatic control is an operation mode having power consumption less than an operation mode prior to applying the target automatic control, and,
when the predicted value exceeds the threshold value, the display acquires information for identifying the non-automatically-controlled equipment from among the plurality of equipments, and highlights an object corresponding to the non-automatically-controlled equipment in the equipment arrangement drawing.

7. The power management system according to claim 6, wherein the controller notifies a user of information for identifying the non-automatically-controlled equipment when an updated value, updated by applying the target automatic control, exceeds the threshold value.

8. A power management method for managing power consumptions of a plurality of equipments provided in a facility, the power management method comprising the steps of:
acquiring power amount information which is information related to power consumption of the plurality of equipments;
displaying an equipment arrangement drawing in which objects corresponding to the plurality of respective equipments are arranged on a floor plan of the facility; and
calculating, based on the power amount information, a predicted value of a power consumption amount which is an accumulated value of power consumptions of the plurality of equipments in a predetermined time period, wherein the plurality of equipments includes an automatically-controlled equipment to which automatic control of automatically controlling power consumptions is applicable, and a non-automatically-controlled equipment to which the automatic control is not applied, the power management method further comprises a step of applying a target automatic control to the automatically-controlled equipment, when the predicted value exceeds a threshold value, the target automatic control is an operation mode having power consumption less than an operation mode prior to applying the target automatic control, and the power management method further comprises a step of, when the predicted value exceeds the threshold value, acquiring information for identifying the non-automatically-controlled equipment from among the plurality of equipments, and highlighting an object corresponding to the non-automatically-controlled equipment in the equipment arrangement drawing.

9. The power management method according to claim 8, further comprising a step of notifying a user of information for identifying the non-automatically-controlled equipment when an updated value, updated by applying the target automatic control, exceeds the threshold value.

* * * * *